(12) United States Patent
Qu

(10) Patent No.: US 9,613,154 B2
(45) Date of Patent: *Apr. 4, 2017

(54) PLATFORM AND APPLICATION METHOD FOR INTER-SYSTEM DATA EXCHANGE BASED ON DATA TAGS

(71) Applicant: Lidong Qu, Beijing (CN)

(72) Inventor: Lidong Qu, Beijing (CN)

(73) Assignee: Lidong Qu, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,738

(22) Filed: Oct. 16, 2016

(65) Prior Publication Data

US 2017/0032048 A1 Feb. 2, 2017

Related U.S. Application Data

(63) Continuation of application No. 14/390,138, filed as application No. PCT/CN2014/082555 on Jul. 18, 2014, now Pat. No. 9,507,869.

(30) Foreign Application Priority Data

Dec. 13, 2013 (CN) .......................... 2013 1 0683777

(51) Int. Cl.
G07F 17/30 (2006.01)
G06F 17/30 (2006.01)
G06K 19/06 (2006.01)

(52) U.S. Cl.
CPC . *G06F 17/30879* (2013.01); *G06K 19/06037* (2013.01); *G06K 19/06046* (2013.01)

(58) Field of Classification Search
None
See application file for complete search history.

(56) References Cited

U.S. PATENT DOCUMENTS 9,507,869 B2 * 11/2016 Qu .................... G06F 17/30879
235/375

FOREIGN PATENT DOCUMENTS

CN 102594898 A 7/2012

* cited by examiner

*Primary Examiner* — Kristy A Haupt
(74) *Attorney, Agent, or Firm* — SV Patent Service

(57) ABSTRACT

The present invention relates to platforms, systems, and application methods for data exchanges between systems based on data tag. The platform for data exchange between systems includes a service management system, a data tag management systems, an application terminal, and a service resource system. The data tag management system obtains service resource information from the service management system based on different applications, and generates data tags. The application terminal obtains the corresponding service resource information from the data tag, interacts with the service management system to obtain service result, thus achieving a variety of service applications. The disclosed system and method can effectively integrate a range of services, facilitate inter-system data exchanges, and improve user experiences, which allow tag data to be applied to the larger scale commercial applications. The disclosed systems and methods are easy to implement at low costs.

12 Claims, 3 Drawing Sheets

10, 15, 20, 25, 30, 35, 40, 45, 50, 55, 60, 65

PLATFORM AND APPLICATION METHOD FOR INTER-SYSTEM DATA EXCHANGE BASED ON DATA TAGS

BACKGROUND OF THE INVENTION

This invention relates to the field of computer information technologies, in particular to the applications of data tags in computer network, and specifically, to a platform and methods for inter-system data exchanges based on data tags.

Barcodes or two-dimensional (2D) codes (also referred as two-dimensional barcodes, data matrix codes, or QR codes) have large information capacity, superior security, high rate of data retrieval, and strong error correction ability. After they were invented, 2D codes have been widely applied to logistics and operations management, and identification card management. With increased popularity of smart phones, 2D codes can be captured and uploaded onto real-time Internet by smart phones in real time and used cross-media channels, which enable them to find wide applications in Object-to-Object (OTO) fields, such as information acquisition, mobile shopping, commodity counterfeiting, identity authentication, coupon distribution, and so on. The OTO applications of 2D codes, however, currently focus primarily on ease of entry in e-commerce; it still lacks in-depth applications.

On the other hand, web-based large-scale commercial application require multiple network devices, such as product information server, information storage server, logistics information server, and billing server, which interact with each other. An unresolved problem in such application is how to effectively integrate these service applications, which inhibits data tags to be used in large-scale commercial applications.

SUMMARY OF THE INVENTION

The purpose of the present invention is to overcome the above-mentioned disadvantages of the prior art, to provide an integrated system that can quickly and conveniently realize a range of services based on data tags. The disclosed systems and methods can facilitate data exchange between systems, improve user experiences, and enable data tags to be applied to larger scale commercial applications. The disclosed platform and application methods for inter-system data exchanges based on data tag are easy to implement and have low implementation costs.

To achieve the above objects, a platform for inter-system data exchanges based on data tag according to the present invention can include: a service management system, a data tag management systems, an application terminal, and a service resource system.

Among them, the service management system stores service resource information for a plurality of services. The service resource information includes at least its corresponding application information and address information. The data tag management system obtains service resource information for at least one service resource from the service management system, and generates a data tag based on the service resource information. The application terminal is responsive to user actions and can obtain the data tag from the data tag data management system and extract the corresponding service resource information from the data tag. The service resource system includes multiple service providing servers, each service providing server corresponding to one of the service resources and is configured to exchange information with the application terminal and send a service result to the application terminal.

The data tag management system includes a data tag issuing server configured to obtain service resource information from the service management system based on applications, and generate data tag according to the service resource information.

The data tag management system can further include a task server configured to store tasks each corresponding to one of the applications and a sequence for the tasks. The task server can send the sequence for the tasks to the data tag issuing server, wherein the data tag specifies the sequence for the tasks.

The application terminal can include a data tag decoding module configured to extract the service resource information and the sequence of tasks from the data tag, which allows the application terminal to interact with multiple service providing servers according to the sequence of tasks.

The inter-system data exchange platform can further include a service integration system configured to obtain the service result that the service resource system sends to the service application terminal, and to store the service result, and to generate information about the service providing server based on the service result.

The service integration system can send the service result to the data tag management system, wherein the data tag management system can generate a data tag based on the service resource information and service result.

The present invention also provides a method for inter-system data exchange based on data tags. The method includes the steps of:

(1) obtaining service resource information based on applications by a data tag management system from a service management system; and generating a data tag based on the service resource information;

(2) obtaining the data tag from the data tag data management system; and extracting the corresponding service resource information from the data tag; and (3) exchanging information with the application terminal by a service resource system; providing a service by the service resource system corresponding to the service resource information; and sending a service result associated with the service to the application terminal.

The data tag management system can include a data tag issuing server configured to obtain service resource information from the service management system based on applications, and generate data tag according to the service resource information, wherein the data tag management system further comprises a task server configured to store tasks each corresponding to one of the applications and a sequence for the tasks, wherein the task server can send the sequence for the tasks to the data tag issuing server, wherein the data tag specifies the sequence for the tasks, wherein step (1) in the method for implementing the platform for inter-system data exchange based on data tags can include: obtaining the service resource information based on applications from the service management system by the data tag issuing server; obtaining the sequence for the tasks from the task server; generating data tag based on the service resource information, wherein the data tag comprises the service resource information and the sequence for the tasks.

The application terminal can include a data tag decoding module, wherein step (2) in the method for implementing the platform for inter-system data exchange based on data tags can include: (21) extracting the service resource information and the sequence for the tasks from the data tag by data tag decoding module; and (22) interacting with the service providing servers by the application terminal according to the sequence of tasks.

The method for inter-system data exchange based on data tags can further include the following steps: (4) obtaining the service result by a service integration system; sending the service result from the service resource system to the application terminal; storing the service result by a service integration system; and based on the service result, producing information about a task server that provides the service.

The method for inter-system data exchange based on data tags can further include the following steps: (5) sending the service result from the service integration system to the data tag management system, wherein the data tag management system is configured to generate a data tag based on the service resource information and service result.

The present invention relates to platform and application methods for inter-system data exchanges based on data tag. The platform for data exchange between systems includes a service management system, a data tag management systems, an application terminal, and a service resource system. The data management system obtains service resource information from the service management system based on different applications, and generates data tags. The application terminal obtains the corresponding service resource information from the data tag, interacts with the service management system to obtain service result, thus achieving a variety of service applications. The disclosed system and method can effectively integrate a range of services, facilitate inter-system data exchanges, and improve user experiences, which allow tag data to be applied among the larger scale commercial applications. The disclosed systems and methods are easy to implement and have low implementation costs.

DETAILED DESCRIPTION OF THE INVENTION

The disclosed invention can be more clearly understood with the following detailed descriptions of the exemplified embodiments.

In some embodiments, the inter-system data exchange platform based on data tags includes a service management system, a data tag management systems, an application terminal, and a service resource system.

Among them, the service management system stores service resource information for a plurality of services. The service resource information includes at least its corresponding application information and address information. The data tag management system obtains service resource information for at least one service resource from the service management system, and generates a data tag based on the service resource information. The application terminal is responsive to user actions and can obtain the data tag from the data tag data management system and extract the corresponding service resource information from the data tag. The service resource system includes multiple service providing servers, each service providing server corresponding to one of the service resources and is configured to exchange information with the application terminal and send a service result to the application terminal.

Figure 1:
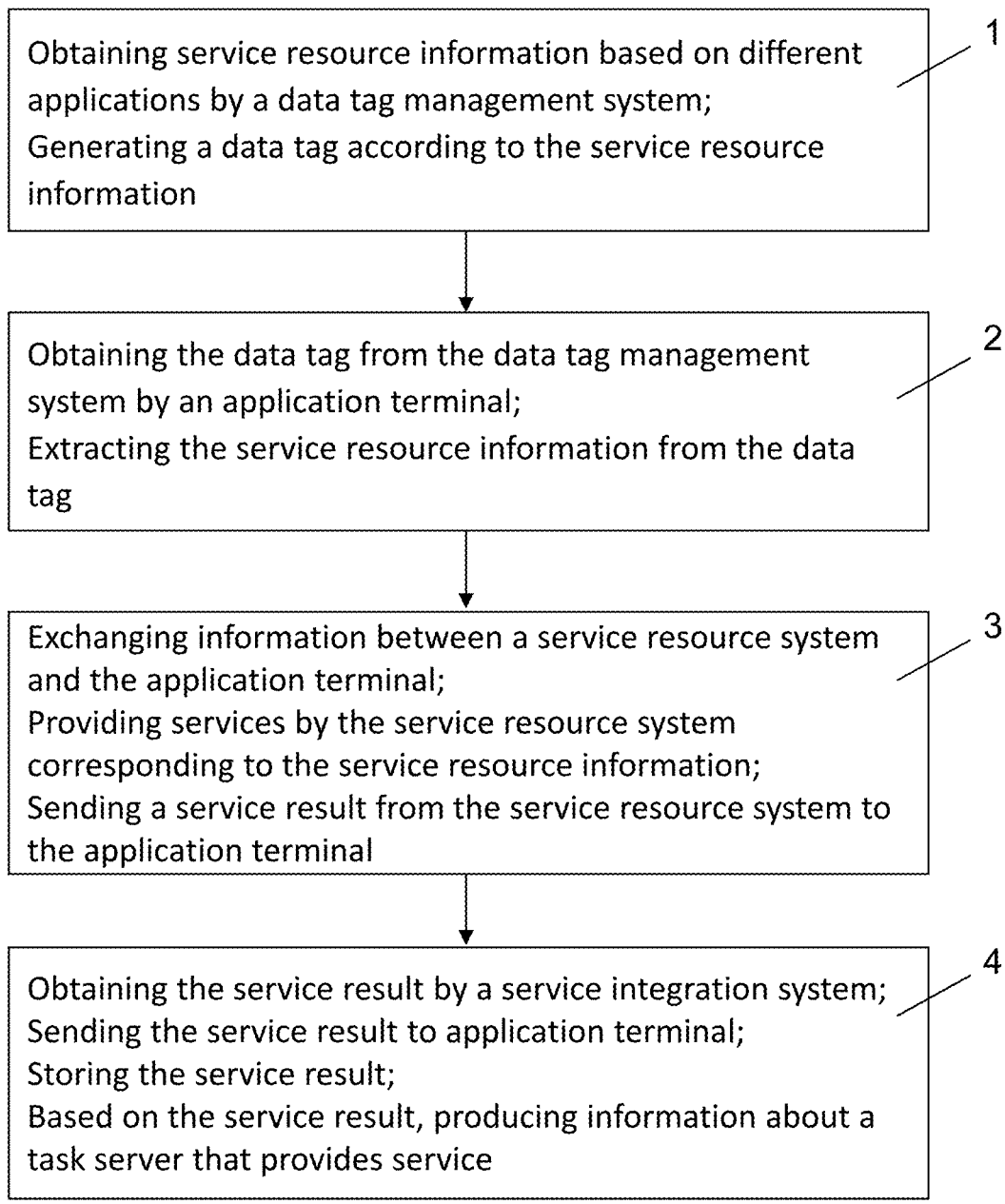
FIG. 1 is a flow diagram for a method for inter-system data exchange based on data tags in accordance with some embodiments of the present invention.

Referring to FIG. 1, the method for implementing the platform for inter-system data exchange based on data tags can include the steps of:

(1) obtaining service resource information based on applications by a data tag management system from a service management system; and generating a data tag based on the service resource information;

(2) obtaining the data tag by an application terminal from the data tag data management system; and extracting the corresponding service resource information from the data tag; and (3) exchanging information with the application terminal by a service resource system; providing a service by the service resource system corresponding to the service resource information; and sending a service result associated with the service to the application terminal.

In some embodiments, the data tag management system includes a data tag issuing server configured to obtain service resource information from the service management system based on applications, and generate data tag according to the service resource information. The data tag management system can further include a task server configured to store tasks each corresponding to one of the applications and a sequence for the tasks. The task server can send the sequence for the tasks to the data tag issuing server, wherein the data tag specifies the sequence for the tasks.

The data tag specifies the sequence for the tasks, wherein step (1) in the method for implementing the platform for inter-system data exchange based on data tags can include: obtaining the service resource information based on applications from the service management system by the data tag issuing server; obtaining the sequence for the tasks from the task server; generating data tag based on the service resource information, wherein the data tag comprises the service resource information and the sequence for the tasks.

In some embodiments, the application terminal can include a data tag decoding module configured to extract the service resource information and the sequence of tasks from the data tag, which allows the application terminal to interact with multiple service providing servers according to the sequence of tasks.

In some embodiments, step (2) in the method for implementing the platform for inter-system data exchange based on data tags can include: (21) extracting the service resource information and the sequence for the tasks from the data tag by data tag decoding module; and (22) interacting with the service providing servers by the application terminal according to the sequence of tasks.

In some embodiments, the inter-system data exchange platform can further include a service integration system configured to obtain the service result that the service resource system sends to the service application terminal, and to store the service result, and to generate information about the service providing server based on the service result. The service integration system can send the service result to the data tag management system, wherein the data tag management system can generate a data tag based on the service resource information and service result.

In some embodiments, the method for implementing the platform for inter-system data exchange based on data tags can further include:

(4) obtaining the service result by a service integration system; sending the service result from the service resource system to the application terminal; storing the service result by a service integration system; and based on the service result, producing information about a task server(s) that provides the service.

(5) sending the service result from the service integration system to the data tag management system, wherein the data tag management system is configured to generate a data tag based on the service resource information and service result.

The presently disclosed systems and methods can be illustrated by the following examples in real applications:

Example 1

Figure 2:
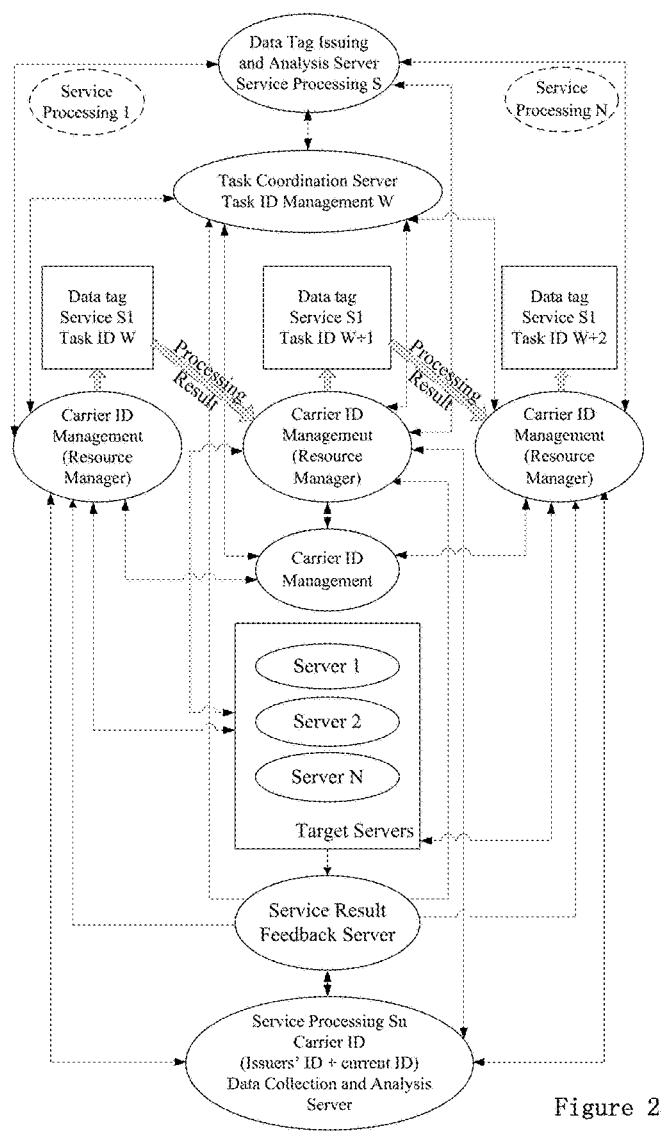
FIG. 2 is an exemplified schematic diagram for a platform for managing tasks for fulfilling a service by an inter-system data exchange platform based on data tags.

OTO Shopping With Parent Supervision and Payment (Task Management Within a Same Service), With a Platform Structure Shown in FIG. 2

A youth under 18 purchases items in a physical store providing OTO service by scanning a first data tag using a smart phone (application terminal) that is installed with a software application for Carrier ID management. In response to the purchase order, the data tag issuing and analysis server assigns a service processing S1, and the task coordination server assigns a task ID W. The data tag issuing and analysis server generates a second data tag that requires order payment (service processing S1; task ID W+1). Since purchases by a youth under 18 require parent's (or guardians') confirmation for payment, the data tag issuing and analysis server pushes the second data tag comprising the order content to the smart phone (application terminal) of the parent or guardian. The parent's smart phone is also installed with a software application for Carrier ID management. The parent determines and decides on whether the ordered items can be purchased, determines the payment platform (service resource system), and makes payment to the order (service processing S1; task ID W+2). The Carrier ID management on the parent's smart phone sends the payment information and order settlement to the task coordination server and the data tag issuing and analysis server. The task coordination server sends the order purchase to appropriate target servers to fulfill the order. It should be noted that there is only one service in this implementation example, that is, the purchase of a product.

Example 2

Figure 3:
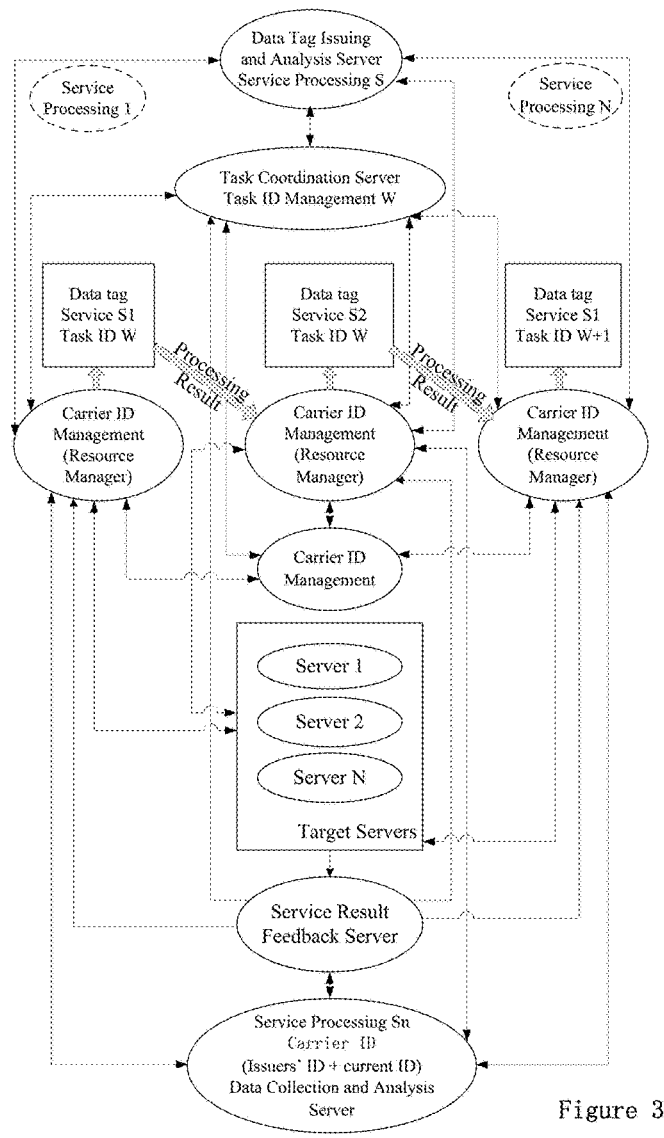
FIG. 3 is an exemplified schematic diagram for a platform for managing tasks for fulfilling different services by an inter-system data exchange platform based on data tags.

Intra Company ERP (Task Management of Multiple Services), With a Platform Structure Shown in FIG. 3

When sales staff develops marketing plans at a corporate meeting, the plans need to be based on the current inventory status in the company's warehouse. The sales personnel use an application terminal to send a data tag to warehouse staff through a computer network. In response, the data tag issuing and analysis server assigns a service processing S1, and the task coordination server assigns a task ID W. The data tag authorizes the release of inventory information about appropriate items stored in the warehouse. The warehouse staff receives the data tag issued by the sales staff, and releases the inventory information about appropriate items according to the instructions in the data tag (service processing S2; task ID W+1) via the task coordination server and the target servers. After receiving authorization to release inventory information about appropriate items stored in the warehouse, the warehouse information management retrieves the requested information from the ERP system (service processing S1; task ID W+1) using appropriate target servers, and provides the requested information to the sales personal at the corporate meeting. It should be noted that there are two services S1 and S2 in this implementation example: the first service S1 relates to the request of inventory information; the second service S2 relates to the retrieval and the supply of such information.

The platform for data exchanges between systems based on data tag includes a service management system, a data tag management systems, an application terminal, and a service resource system. The data tag management system obtains service resource information from the service management system based on different applications, and generates data tags. The application terminal obtains the corresponding service resource information from the data tag, interacts with the service management system to obtain service result, thus achieving a variety of service applications. The disclosed system and method can effectively integrate a range of services, facilitate inter-system data exchanges, and improve user experiences, which allow tag data to be applied among the larger scale commercial applications. The disclosed systems and methods are easy to implement and have low implementation costs.

In the present specification, the present invention has been described with specific examples. However, it should be noted that various modifications and variations may be made without departing from the spirit and scope of the invention. Accordingly, the specification and drawings are to be regarded for illustrative rather than restrictive purposes.

What is claimed is:

1. A data exchange system based on data tags, comprising:
   a service management system that stores service resource information for fulfilling a first application, wherein the service management system defines a sequence of tasks for the first application, wherein the sequence of tasks includes at least a first task and a second task, wherein the second task is dependent on the first task;
   a data tag management system in communication with the resource management system, wherein the data tag management system is configured to produce a first data tag associated with the first task based on the service resource information, and to produce a second data tag associated with the second task based on the service resource information in response to completion of the first task;
   a first application terminal responsive to user actions, configured to obtain the first data tag from the data tag management system, and to extract the service resource information from the first data tag to fulfill the first task;
   a second application terminal responsive to user actions, configured to obtain the second data tag from the data tag management system after the first task is completed, and to extract the service resource information from the second data tag to fulfill the second task; and
   one or more service providing servers configured to fulfill the first application in response to the first application terminal and the second application terminal, and to send a service result to the first application terminal or the second application terminal.

2. The data exchange system of claim 1, wherein the data tag management system comprises a data tag issuing server configured to obtain the service resource information from the service management system, and to generate the first data tag and the second data tag according to the service resource information.

3. The data exchange system of claim 1, wherein the service management system is configured to complete a third task associated with the first application in response to completion of the second task under the control of the second application terminal, wherein the one or more of the service providing servers are configured to fulfill the first application in response to completion of the third task.

4. The data exchange system of claim 3, wherein the first application terminal or the second application terminal comprises a data tag decoding module configured to extract the service resource information and the sequence of tasks from the first data tag or the second data tag, which allows the first application terminal and the second application terminal to interact with the one or more service providing servers according to the sequence of tasks.

5. The data exchange system of claim 1, wherein the data tag management system is configured to receive the service result and generate a fourth data tag based on the service resource information and the service result.

6. A method for inter-system data exchange based on data tags, comprising:
   (1) storing service resource information for a first application by a service management system;
   defining a sequence of tasks for the first application by the service management system, wherein the sequence of tasks includes at least a first task and a second task;
   obtaining service resource information by a data tag management system from a service management system; and
   generating a first data tag based on the service resource information by the data tag management system;
   (2) sending the first data tag from the data tag management system to a first application terminal;
   extracting the service resource information from the data tag by the first application terminal;
   fulfilling the first task in response to user commands at the first application terminal;
   sending the first data tag from the data tag management system to a second application terminal;
   extracting the service resource information from the first data tag by the second application terminal; and
   fulfilling the second task in response to user commands at the second application terminal; and
   (3) exchanging information with the first application terminal and the second application terminal by a service resource system;
   providing a service for the first application by the service resource system; and
   sending a service result associated with the service to the first application terminal and the second application terminal.

7. The method for inter-system data exchange of claim 6, wherein the first data tag management system comprises a data tag issuing server, the method further comprising:
   obtaining the service resource information from the service management system by the data tag issuing server; and
   generating the first data tag according to the service resource information by the data tag issuing server, wherein the data tag specifies the sequence for the tasks.

8. The method for inter-system data exchange of claim 6, wherein the data tag management system further comprises a task server, the method further comprising:
   storing the tasks corresponding to the first application and a sequence for the tasks by the task server; and
   sending the sequence for the tasks from the task server to the data tag issuing server.

9. The method for inter-system data exchange of claim 8, wherein step (1) further comprises:
   obtaining the service resource information from the service management system by the data tag issuing server;
   obtaining the sequence for the tasks from the task server; and
   generating the first data tag based on the service resource information, wherein the first data tag comprises the service resource information and the sequence for the tasks.

10. The method for inter-system data exchange of claim 8, wherein the first application terminal or the second application terminal includes a data tag decoding module, wherein step (2) comprises:
    (21) extracting the service resource information and the sequence for the tasks from the first data tag by data tag decoding module; and
    (22) interacting with service providing servers in the service resource system by the first application terminal or the application terminal according to the sequence of tasks.

11. The method for inter-system data exchange of claim 6, further comprising:
    receiving the service result by the data tag management system; and
    generating a second data tag by the data tag management system based on the service resource information and service result.

12. A method for inter-system data exchange based on data tags, comprising:
    (1) storing service resource information for a first application by a service management system;
    defining a sequence of tasks for the first application by the service management system, wherein the sequence of tasks includes at least a first task and a second task, wherein the second task is dependent on the first task;
    obtaining service resource information by a data tag management system from the service management system;
    generating a first data tag associated with the first task based on the service resource information by the data tag management system; and
    generating a second data tag associated with the second task based on the service resource information by the data tag management system;
    (2) sending the first data tag from the data tag management system to a first application terminal;
    extracting the service resource information from the first data tag by the first application terminal;
    fulfilling the first task in response to user commands at the first application terminal;
    after the first task is completed, sending the second data tag from the data tag management system to a second application terminal;
    extracting the service resource information from the second data tag by the second application terminal; and
    fulfilling the second task in response to user commands at the second application terminal; and
    (3) exchanging information with the first application terminal and the second application terminal by a service resource system;
    providing a service for the first application by the service resource system; and
    sending a service result associated with the service to the first application terminal and the second application terminal.

* * * * *